United States Patent
Rodriguez et al.

(10) Patent No.: US 9,311,404 B2
(45) Date of Patent: Apr. 12, 2016

(54) OBSCURING SEARCH RESULTS TO INCREASE TRAFFIC TO NETWORK SITES

(75) Inventors: Adrian X. Rodriguez, Durham, NC (US); Eric Woods, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 265 days.

(21) Appl. No.: 13/227,775

(22) Filed: Sep. 8, 2011

(65) Prior Publication Data
US 2013/0066889 A1    Mar. 14, 2013

(51) Int. Cl.
G06F 17/30    (2006.01)

(52) U.S. Cl.
CPC ................. *G06F 17/30864* (2013.01)

(58) Field of Classification Search
USPC ................................... 707/706–787
See application file for complete search history.

(56) References Cited

U.S. PATENT DOCUMENTS

| | | | |
|---|---|---|---|
| 7,752,237 | B2 | 7/2010 | Ray |
| 8,954,412 | B1 * | 2/2015 | Zhao et al. ............ 707/706 |
| 2006/0004716 | A1 | 1/2006 | Hurst-Hiller et al. |
| 2007/0106639 | A1 | 5/2007 | Subramaniam et al. |
| 2008/0189281 | A1 | 8/2008 | Cancel et al. |
| 2008/0306913 | A1 * | 12/2008 | Newman et al. ............ 707/3 |
| 2009/0063264 | A1 * | 3/2009 | Leung ............... 705/14 |
| 2009/0150345 | A1 | 6/2009 | Van Luchene |
| 2009/0204579 | A1 | 8/2009 | Govani et al. |
| 2009/0313100 | A1 | 12/2009 | Ingleshwar |
| 2010/0082652 | A1 * | 4/2010 | Jones et al. ............ 707/758 |
| 2010/0223250 | A1 * | 9/2010 | Guha ............... 707/706 |
| 2010/0274753 | A1 | 10/2010 | Liberty et al. |
| 2010/0287170 | A1 | 11/2010 | Liu et al. |
| 2011/0035401 | A1 | 2/2011 | Nye |
| 2011/0082850 | A1 | 4/2011 | Ball et al. |
| 2011/0087545 | A1 | 4/2011 | Gross |
| 2011/0093456 | A1 | 4/2011 | Ryan et al. |
| 2011/0106746 | A1 | 5/2011 | Ventilla et al. |

OTHER PUBLICATIONS

Dou et al., "Find Answers From Web Search Results", WISA 7th Conference on, Aug. 20-22, 2010, pp. 95-98.
IBM et al., "Search Result Advertisements", IPCOM000014059D, Jan. 1, 2000, 3 pages.
"The Free and Open Software Behind IBM's Jeopardy Champion Watson", http://www.heatonresearch.com/, pp. 1-4, submitted Mar. 12, 2011.
Google, Search results for "2+1", 1 page.

* cited by examiner

*Primary Examiner* — Hosain Alam
*Assistant Examiner* — Tuan-Khanh Phan
(74) *Attorney, Agent, or Firm* — Joe Polimeni; Edell, Shapiro & Finnan, LLC

(57) ABSTRACT

According to an embodiment of the present invention, a system alters search results to increase traffic at network sites, and comprises a computer system including at least one processor. The system processes a search query including an inquiry to determine corresponding search results and an answer to the inquiry, wherein the search results include one or more network sites and a corresponding description of content. The search results are filtered to remove from view the answer from the description of content for the network sites. The filtered search results are displayed to enable access of the network site having a corresponding description of content indicating the network site contains the answer. Alternatively, the answer is highlighted for readily viewing by the user. Embodiments of the present invention further include a method and computer program product for altering search results in substantially the same manners described above.

10 Claims, 5 Drawing Sheets

QUERY: WHO WAS PRESIDENT IN 1803?

RESULTS:

1. EARLY U.S. PRESIDENTS

WWW.EXAMPLE.ORG/UNITED_STATES_PRESIDENTS.HTML

THE THIRD U.S. PRESIDENT WAS [FIND ANSWER HERE], WHO...

2. LEWIS AND CLARK

WWW.EXAMPLE.EDU/LEWISANDCLARK.HTML

PRESIDENT [FIND ANSWER HERE] COMMISSION THE LEWIS AND CLARK EXPEDITION TO...

FIG.4

QUERY: WHO WAS PRESIDENT IN 1803?

THOMAS JEFFERSON WAS PRESIDENT IN 1803.

RESULTS:

1. EARLY U.S. PRESIDENTS

WWW.EXAMPLE.ORG/UNITED_STATES_PRESIDENTS.HTML

THE THIRD U.S. PRESIDENT WAS THOMAS JEFFERSON, WHO...

2. LEWIS AND CLARK

WWW.EXAMPLE.EDU/LEWISANDCLARK.HTML

PRESIDENT JEFFERSON COMMISSION THE LEWIS AND CLARK EXPEDITION TO...

FIG.5

OBSCURING SEARCH RESULTS TO INCREASE TRAFFIC TO NETWORK SITES

BACKGROUND

1. Technical Field

Present invention embodiments relate to accessing network sites, and more specifically, to obscuring content within search results to increase traffic to network sites.

2. Discussion of Related Art

Web search engines conduct a search in response to a user query, and return links to web pages with previews or short descriptions of corresponding content in order to provide context about the uncovered web pages. These descriptions of content are intended to assist a user in deciding which link to select. The answer to the user query is usually displayed within a description of the content without the user actually visiting the corresponding web site.

BRIEF SUMMARY

According to an embodiment of the present invention, a system alters search results to increase traffic at network sites, and comprises a computer system including at least one processor. The system processes a search query including an inquiry to determine corresponding search results and an answer to the inquiry, wherein the search results include one or more network sites and a corresponding description of content. The search results are filtered to remove from view the answer from the description of content for the network sites. The filtered search results are displayed to enable access of the network site having a corresponding description of content indicating the network site contains the answer. Alternatively, the answer is highlighted for readily viewing by the user. Embodiments of the present invention further include a method and computer program product for altering search results in substantially the same manners described above.

BRIEF DESCRIPTION OF THE SEVERAL VIEWS OF THE DRAWINGS

FIG. 4 is an illustration of example search results with an obscured answer.

FIG. 5 is an illustration of example search results with a highlighted answer.

DETAILED DESCRIPTION

Present invention embodiments pertain to identifying and obscuring relevant portions of search results to increase traffic to network sites. For example, a user may provide a search query having a fact based answer to a search engine. Present invention embodiments determine the fact based answer to the query within a reasonable degree of confidence, and obscure or hide the answer within the brief description of content for uncovered web sites in the search results. Natural language processing and analysis may be used to determine the answer and assign a measure of confidence to the result. Alternatively, common content among search results may be utilized to determine the answer. Relevant text may be placed around the obscured answer to indicate that the site provides the answer, thereby encouraging the user to visit the website.

The network site receives increased traffic as a result of providing the answer, thereby gaining enhanced value to advertisers, and becoming more likely to be rated higher (e.g., increased credibility, etc.) for search engines. Alternatively, a search engine provider obtains more click credit with respect to paid results since a user is encouraged to actually visit the site.

According to another embodiment of the present invention, the answer to the query is determined and highlighted (or otherwise rendered visually distinguishable), thereby enabling the answer to be readily detected. For example, when a user submits a query of "When was Thanksgiving in 1990", the answer may be highlighted (or otherwise rendered visually distinguishable) within the search results and/or displayed (e.g., "Thanksgiving in 1990: Nov. 22" may be highlighted or appear in bold during display of search results).

Figure 1:
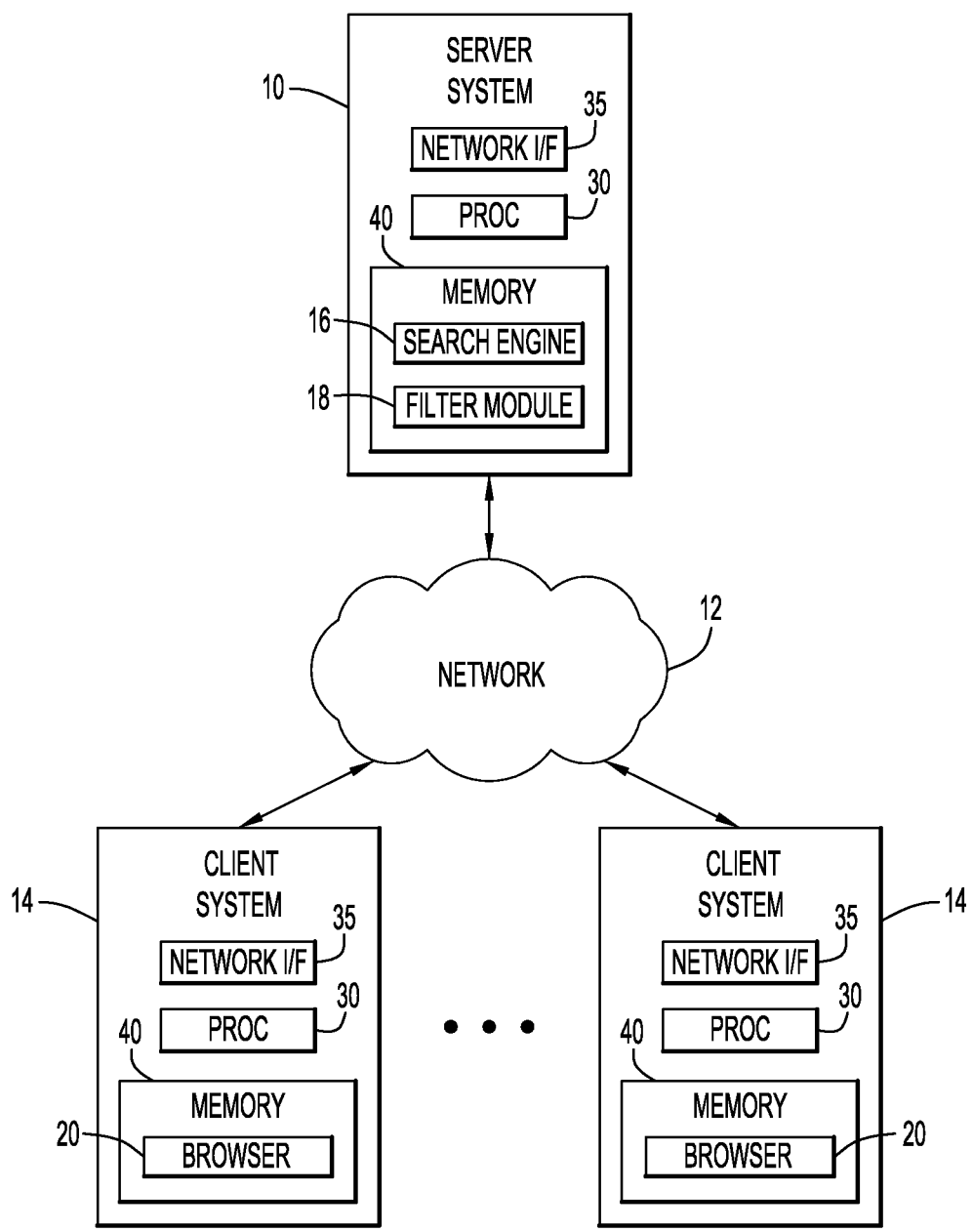
FIG. 1 is a diagrammatic illustration of a computing environment for an embodiment of the present invention.

An example computing environment for use with a present invention embodiment is illustrated in FIG. 1. Specifically, the environment includes one or more server systems 10 and one or more client or end-user systems 14. Server systems 10 and client systems 14 may be remote from each other and communicate over a network 12.

Network 12 may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Server systems 10 include a search engine 16 and a filter module 18. The search engine may be implemented by any conventional or other search engine, and may be distributed across plural computer systems. Alternatively, filter module 18 may reside on a client system 14 or other computer system in communication with the client system.

Client systems 14 enable users to submit search or other queries to server systems 10 to retrieve search results. The client systems may include a web browser 20, and present any graphical user (e.g., GUI, etc.) or other interface (e.g., command line prompts, menu screens, etc.) to solicit queries from users and display results.

Server systems 10 and client systems 14 may be implemented by any conventional or other computer systems preferably equipped with a display or monitor, a base (e.g., including at least one processor 30, memories 40 and/or internal or external network interface or communications devices 35 (e.g., modem, network cards, etc.)), optional input devices (e.g., a keyboard, mouse, or other input device), and any commercially available and custom software (e.g., browser software, communications software, server software, natural language processing software, search engine and web crawling software, filter module, etc.). The computer systems may include server, desktop, laptop, and hand-held devices. In addition, filter module 18 may include one or more modules or units to perform the various functions of present invention embodiments described below (e.g., identifying and obscuring an answer within search results, etc.), and may be implemented by any combination of any quantity of software and/or hardware modules or units.

Figure 2:
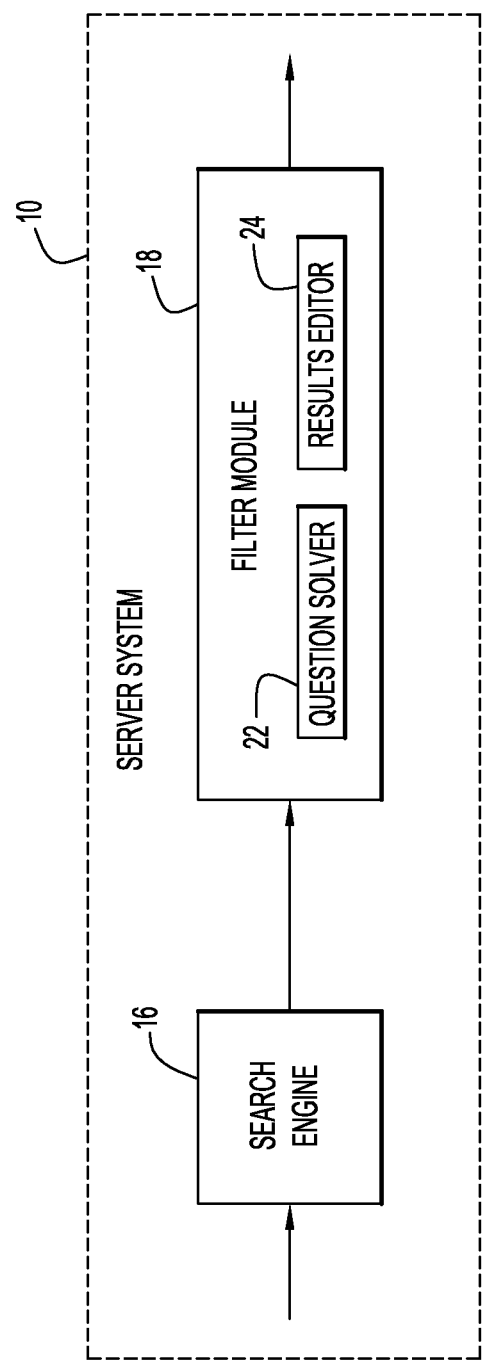
FIG. 2 is a block diagram of a server system including a search engine and a filter module according to an embodiment of the present invention.

A block diagram of a server system 10 including search engine 16 and filter module 18 according to an embodiment of the present invention is illustrated in FIG. 2. In particular, search engine 16 receives a search query and determines search results. The search results include a list of network sites with a description of content for each site. The description of content for a network site may include any preview, contextual information, excerpt, or summary. Search engine 16 provides the query and the search results to filter module 18 for processing.

Filter module 18 includes a question solver module 22 to determine the answer to the query, and a results editor module 24 to alter the search results. Question solver module 22 receives or accesses the query, and optionally receives or accesses all or part of the search results. If question solver module 22 determines an answer, results editor module 24 obscures the answer within the descriptions of content in the search results (e.g., deletes or erases the answer, masks or replaces the answer with characters or symbols, etc.) to remove the answer within the search results from view. Filter module 18 produces the search results with modifications incorporated by results editor module 24, and provides the modified results to client system 14 via server system 10.

Figure 3:
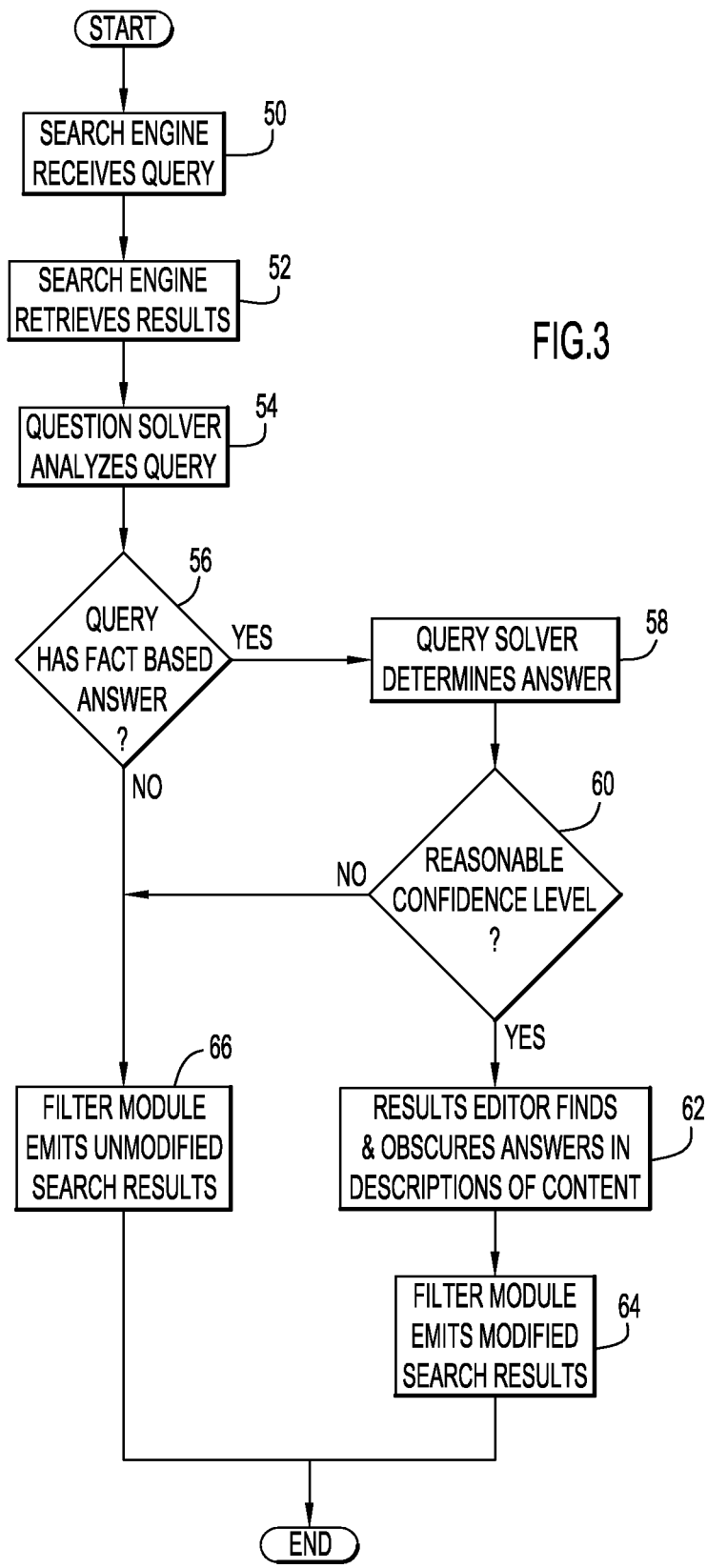
FIG. 3 is a procedural flow chart illustrating an example manner in which search results are filtered according to an embodiment of the present invention.

A manner in which search engine 16 and filter module 18 process the query and search results (e.g., via server system 10) according to an embodiment of the present invention is illustrated in FIG. 3. Initially, the search engine (e.g., via server system 10) receives a query at step 50, and retrieves results for the query at step 52. The results include a list of network sites with a description of content for each site.

Question solver module 22 (e.g., via server system 10) analyzes the query at step 54, and determines whether the query represents a fact based inquiry that may be satisfied by a fact based answer at step 56. The question solver module may identify fact based inquiries by the presence of question words, word order, or punctuation. The question solver module may employ conventional natural language processing techniques to identify fact based inquiries, where the queries may be of any type or format.

If the query represents a fact based inquiry, the question solver module (e.g., via server system 10) determines the answer at step 58. Otherwise, filter module 18 (e.g., via server system 10) produces the search results without modification at step 66. Question solver module 22 may use any combination of the search results and other resources, and employ any conventional or other techniques (e.g., or conventional systems) for analyzing the query and determining the answer. For example, the question solver module (e.g., via server system 10) initially parses the query and forms hypotheses with respect to an answer. The hypotheses are verified against evidence, and are assigned confidence levels. When the confidence level of a hypothesis exceeds a confidence threshold, the answer (corresponding to the hypothesis) is provided. These tasks or functions may be performed based on conventional techniques of natural language processing, semantic analysis, information retrieval, automated reasoning, and machine learning. The question solver module may further use various internal and external information sources to understand the query and form and verify hypotheses (e.g., web pages, data caches, databases, or other storage structures containing indexes, metadata, language rules, dictionaries, thesauri, encyclopaedias, articles, literary works, etc.). By way of example, the question solver module may include or communicate with a conventional system (e.g., IBM WATSON system, etc.) employing these types of techniques to ascertain the answer to the query.

Alternatively, question solver module 22 may determine the answer (e.g., via server system 10) by leveraging commonalities among search results. In particular, the question solver module may analyze the search results, and determine occurrence of common content within the listed network sites. The question solver module may determine the type or form of the answer (e.g., date/day of week, numeric answer, etc.) based on the user query. This may be accomplished by conventional natural language processing, semantic analysis, and other techniques, such as those described above. When common content (e.g., with the determined type or form for the answer) appears in a quantity of network sites that meets or exceeds a threshold, the common content is considered to satisfy the query and form the answer. For example, when the user query includes "When was Thanksgiving in 1990?", the question solver module (e.g., via server system 10) analyzes the search results for common content. If a quantity of network sites (e.g., 40% of network sites) within the search results include the date "November 22", the question solver module determines, with reasonable confidence, that Thanksgiving was on Nov. 22, 1990 (in response to the quantity of network sites containing this content to meet or exceed a threshold). Question solver module 22 may assign a measure of confidence to an answer based on various criteria (e.g., the quantity and/or ranking of sources (e.g., number of the top sites in the results, etc.) containing the answer or equivalent forms of the answer, the empirical reliability of the sources, etc.). The threshold may be with respect to an actual quantity of sites, a percentage of sites, or any other desired criteria.

If the question solver module determines an answer to the query (e.g., with a reasonable degree of confidence based on the natural language processing or commonality techniques described above) as determined at step 60, the answer is provided to results editor module 24 to obscure (e.g., remove from view) all occurrences of the answer from the description of content at step 62. In particular, results editor module 24 initially identifies the answer provided by question solver module 22 within the search results. This may be accomplished in various fashions. For example, the results editor module may compare content within the search results to the answer provided by question solver module 22. An answer may be identified within the search results based on any desired similarity. For example, the results editor module may utilize various techniques to identify the answer within the search results including rule sets, fuzzy matching (e.g., partial or whole matching, etc.), confidence levels or thresholds, matching of equivalent forms (e.g., "November 22" with "22 November" or "11/22", numbers with spelled phrases ("10" with "ten", etc.), etc. The question solver module may provide the results editor module with variations on the forms of the answer.

Filter module 18 (e.g., via server system 10) produces modified search results at step 64. In particular, filter module 18 obscures the identified answer within the search results to remove the answer from view. This may be accomplished in various manners. For example, the answer may be deleted or removed from the search results, or masked or replaced with characters or symbols. Further, the visual appearance of the answer within the search results may be altered to be visually incomprehensible (e.g., blurred, distorted, etc.). Any portion of the answer and any quantity of accompanying terms or characters adjacent the answer within the content may be obscured. The portion of the answer and quantity of accompanying terms or characters to be obscured may be based on any desired criteria (e.g., predetermined parameter, based on the size of the content for a site, etc.). Further, the content containing the answer may include any relevant text, characters or other symbols to indicate the presence of the answer within that content (e.g., FIG. 4) (even though the answer has been removed from view). This informs a user of the presence of the answer within a network site to encourage the user to visit that site and ascertain the answer.

Alternatively, the answer may be conspicuously provided separately from the description of content, and in a manner drawing attention to occurrences of the answer within the description of content. For example, the answer may be separately displayed and provided in the search results in bold (or other effect including different colors, fonts, sizes, flashing, surrounded by various symbols, etc.). If no answer is ascertained as determined at step 60, filter module 18 (e.g., via server system 10) produces the search results without modification at step 66 as described above.

Example search results modified by the filter module to obscure an answer to a query is shown in FIG. 4. By way of example, the search results for an example query, "Who was President in 1803?" are provided. The answer is obscured and replaced (or masked) by the example text "[FIND ANSWER HERE]" to inform a user of the presence of the answer within a network site, and encourage the user to visit that site.

An example of distinguishing the answer from other content within the search results is illustrated in FIG. 5. In this case, the answer is displayed separately from the description of content, and in a manner drawing attention to occurrences of the answer within the description of content according to an alternative embodiment of the present invention. By way of example, the search results for an example query, "Who was President in 1803?" are provided. The answer in this example (e.g., "Thomas Jefferson") is displayed in bold at the top and within the search results.

It will be appreciated that the embodiments described above and illustrated in the drawings represent only a few of the many ways of implementing embodiments for obscuring search results to increase traffic to network sites.

The question solver module may use any manner of analysis to determine whether a query represents a fact based inquiry (e.g., language rule sets, language processing, semantic analysis, information retrieval, automated reasoning, machine learning, etc.). The question solver module may use any manner of determining an answer to a query (e.g. frequency analysis, reliability and fuzzy matching, language processing, semantic analysis, information retrieval, automated reasoning, machine learning, etc.). Further, the question solver module may use any combination of information resources (e.g., search results, web pages, data caches, databases, etc.) containing any structured or unstructured data (e.g., indexes, metadata, language rules, dictionaries, thesauri, encyclopedias, articles, literary works, etc.).

The results editor module may use any manner of altering the search results (e.g., answers may be obscured or redacted by deleting, masking, blurring, replacing with other data, etc.). Further, the results editor module may use any manner of distinguishing an answer from within the search results (e.g., highlighting, setting font characteristics (e.g., type, size, or effects such as bold, italic, or underline), flashing, setting foreground or background color, changing location, any combinations thereof, etc.).

The filter module may be incorporated into the search engine, where the filter module functionality is integrated with that of the search engine. For example, the search engine may formulate the search results directly based on input from the question solver, absorbing the functionality of the results editor module into the search engine for generating results.

The topology or environment of the present invention embodiments may include any number of computer or other processing systems (e.g., client or end-user systems, server systems, etc.) and search engines, databases, or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any commercially available or custom software (e.g., browser software, communications software, server software, natural language processing software, search engine and web crawling software, filter module, etc.). These systems may include any types of monitors and input devices (e.g., keyboard, mouse, voice recognition, touch screen, etc.) to enter and/or view information.

It is to be understood that the software (e.g., filter module, question solver module, results editor module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., filter module, question solver module, results editor module, etc.) may be available on a computer useable or recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other search engines, databases, data stores or storage structures (e.g., files, databases, data structures, data or other repositories, etc.) to store information (e.g., web pages, caches, indexes, metadata, language rules, dictionaries, thesauri, encyclopedias, articles, literary works, etc.). The data-base system may be implemented by any number of any conventional or other databases, data stores or storage structures (e.g., files, databases, data structures, data or other repositories, etc.) to store information (e.g., web pages, caches, indexes, metadata, language rules, dictionaries, thesauri, encyclopedias, articles, literary works, etc.). The search engine and/or filter module may be included within or coupled to the server and/or client systems. The search engine and/or filter module data storage structures may be remote from or local to the computer or other processing systems, and may store any desired data (e.g., rules, data to be analyzed, etc.).

Present invention embodiments may be utilized for filtering, highlighting, obscuring, or adding any types of data (e.g., alpha numeric text, symbols, markup language, previews, images, waveforms, binary data, etc.) representing any information. Further, present invention embodiments may be utilized for filtering search results from any types of sources (e.g., web sites, files, directories, databases, memory devices, data structures, processing devices, various types of stationary or mobile computer or processing systems or devices, etc.).

The search results filtered may be of any size, displayed as any number of pages, and include any type of data (e.g., boolean, character, alphanumeric, numeric, symbols, etc.) representing any information.

The present invention embodiments may employ any number of any type of user interface (e.g., Graphical User Interface (GUI), command-line, prompt, etc.) for obtaining or providing information (e.g., obtaining information for the desired query, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks, algorithms, or network/environment described above, but may be utilized for filtering, obscuring, or providing any type of information in a manner to entice access to the information host device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (Java and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The various modules (e.g., search engine, browser, filter module, question solver module, results editor module, etc.) may be implemented by any combination of any quantity of software and/or hardware modules or units, and may reside within memory 40 of the server and client systems for execution by processor 30. Further, present invention embodiments may be utilized for any types of inquiries (e.g., factual, hypothetical, involving deduction or estimation, etc.) to obscure any desired information within the results.

What is claimed is:

1. A computer-implemented method of altering search results to increase traffic at network sites comprising: receiving a search query including a fact-based inquiry;
   determining a fact-based answer to the fact-based inquiry, wherein determining comprises:
      forming a hypothetical answer, wherein forming the hypothetical answer further comprises examining the search results and determining the hypothetical answer based on common content within the search results;
      assigning a measure of confidence to the hypothetical answer; and
      determining that the assigned measure of confidence exceeds a confidence threshold;
   receiving search results for the search query, wherein the search results include a reference enabling access to a network site and a corresponding description of content;
   filtering the search results to alter the description of content by removing the fact-based answer from view within the description of content for the network site and indicating that the network site contains the fact-based answer, wherein filtering the search results includes at least one of deleting the fact-based answer from the search results and masking the fact-based answer within the search results; and
   displaying the filtered search results including the reference to the network site.

2. The computer-implemented method of claim 1, wherein filtering the search results further includes:
   removing the fact-based answer and at least one accompanying character adjacent the fact-based answer from the search results.

3. The computer-implemented method of claim 1, wherein filtering the search results further includes:
   replacing the fact-based answer with information indicating the presence of the fact-based answer at the network site.

4. The computer-implemented method of claim 1, wherein forming the hypothetical answer further comprises:
   determining the hypothetical answer without examining the search results.

5. The computer-implemented method of claim 1, wherein the fact-based inquiry is in the form of a question and the determined fact-based answer answers the question.

6. A system for altering search results to increase traffic at network sites comprising:
   a computer system including at least one processor configured to:
      receive a search query including a fact-based inquiry;
      determine a fact-based answer to the fact-based inquiry, wherein determining comprises:
         forming a hypothetical answer, wherein forming the hypothetical answer further comprises examining the search results and determining the hypothetical answer based on common content within the search results;
         assigning a measure of confidence to the hypothetical answer; and
         determining that the assigned measure of confidence exceeds a confidence threshold;
      receive search results for the search query, wherein the search results include a reference enabling access to a network site and a corresponding description of content;
      filter the search results to alter the description of content by removing the fact-based answer from view within the description of content for the network site and indicating that the network site contains the fact-based answer, wherein filtering the search results includes at least one of deleting the fact-based answer from the search results and masking the fact-based answer within the search results; and display the filtered search results including the reference to the network site and altered description of content to enable access of the network site.

7. The system of claim 6, wherein filtering the search results further includes:

removing the fact-based answer and at least one accompanying character adjacent the fact-based answer from the search results.

8. The system of claim 6, wherein filtering the search results further includes:

replacing the fact-based answer with information indicating the presence of the fact-based answer at the network site.

9. A computer program product for altering search results to increase traffic at network sites comprising:

a computer readable storage medium having computer readable code embodied therewith, the computer readable program code comprising computer readable program code configured to:

receive a search query including a fact-based inquiry;

determine a fact-based answer to the fact-based inquiry, wherein determining comprises:

forming a hypothetical answer, wherein forming the hypothetical answer further comprises examining the search results and determining the hypothetical answer based on common content within the search results;

assigning a measure of confidence to the hypothetical answer; and determining that the assigned measure of confidence exceeds a confidence threshold;

receive search results for the search query, wherein the search results include a reference enabling access to a network site and a corresponding description of content;

filter the search results to alter the description of content by removing the fact-based answer from view within the description of content for the network site and indicating that the network site contains the fact-based answer, wherein filtering the search results includes at least one of deleting the fact-based answer from the search results and masking the fact-based answer within the search results; and display the filtered search results including the reference to the network site and altered description of content to enable access of the network site.

10. A computer-implemented method of determining search results comprising:

receiving a search query that includes a fact-based inquiry;

determining a fact-based answer to the fact-based inquiry, wherein determining comprises:

forming a hypothetical answer, wherein forming the hypothetical answer further comprises examining the search results and determining the hypothetical answer based on common content within the search results;

assigning a measure of confidence to the hypothetical answer; and determining that the assigned measure of confidence exceeds a confidence threshold;

determining search results for the search query, wherein the search results include a reference enabling access to a network site and a corresponding description of content;

determining that the description of content contains the determined answer;

filtering the search results to visually distinguish the determined fact-based answer from the search results within the description of content for the network site, wherein filtering the search results includes at least one of deleting the fact-based answer from the search results and masking the fact-based answer within the search results; and displaying the visually distinguishable determined answer in the description of content within the search results.

* * * * *